United States Patent
Hsieh

(10) Patent No.: US 11,662,614 B2
(45) Date of Patent: May 30, 2023

(54) DISPLAY PANEL AND DISPLAY APPARATUS

(71) Applicant: BOE Technology Group Co., Ltd., Beijing (CN)

(72) Inventor: Changhan Hsieh, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/406,109

(22) Filed: Aug. 19, 2021

(65) Prior Publication Data

US 2022/0100012 A1 Mar. 31, 2022

(30) Foreign Application Priority Data

Sep. 25, 2020 (CN) .......................... 202022141857.9

(51) Int. Cl.
*G02F 1/1339* (2006.01)
*G02F 1/1333* (2006.01)
*G02F 1/1335* (2006.01)

(52) U.S. Cl.
CPC .......... *G02F 1/1333* (2013.01); *G02F 1/1339* (2013.01); *G02F 1/133305* (2013.01); *G02F 1/133512* (2013.01); *G02F 1/133514* (2013.01)

(58) Field of Classification Search
None
See application file for complete search history.

(56) References Cited

U.S. PATENT DOCUMENTS

2012/0099056 A1 * 4/2012 Lee ................... G02F 1/133512
445/24
2022/0085306 A1 * 3/2022 Peng ................. G02F 1/133305

FOREIGN PATENT DOCUMENTS

KR 20060073757 A * 6/2006

* cited by examiner

*Primary Examiner* — Shan Liu
(74) *Attorney, Agent, or Firm* — Ling Wu; Stephen Yang; Ling and Yang Intellectual Property

(57) ABSTRACT

Provided is a display panel and a display apparatus, wherein the display panel includes a first substrate and a second substrate oppositely disposed and a liquid crystal layer disposed between the first substrate and the second substrate; wherein the first substrate includes a first display region and a bonding region disposed on a side of the first display region; the second substrate includes a second display region and a cutting region disposed on a side of the second display region; an orthographic projection of the cutting region on the first substrate overlaps an orthographic projection of the bonding region on the first substrate; the cutting region is provided with a cutting line; a side of the second substrate facing the first substrate is provided with a cut stop layer.

12 Claims, 7 Drawing Sheets

DISPLAY PANEL AND DISPLAY APPARATUS

CROSS-REFERENCE TO RELATED APPLICATION

The present application claims the priority to the Chinese Patent Application No. 202022141857.9 filed to the CNIPA on Sep. 25, 2020, the content of which is hereby incorporated by reference.

TECHNICAL FIELD

Embodiments of the present disclosure relate to, but are not limited to, the field of display technologies, and in particular to a display panel and a display apparatus.

BACKGROUND

A Liquid crystal display (LCD) has advantages of high image quality, small size, light weight, low voltage drive, low power consumption, wide application range, and etc., and is widely used in consumer electronics or computer products such as a TV, a mobile phone, and a computer monitor. With a gradual rise of wearable application devices such as smart glasses and smart watches, a demand for flexible display devices in a display industry is increasing. A flexible liquid crystal display has gradually become a new research hotspot in the industry.

SUMMARY

The following is an overview of the subject matter described in detail in the present disclosure. The summary is not intended to limit the scope of protection of claims.

The present disclosure provides the following technical solution: a display panel includes a first substrate and a second substrate oppositely disposed and a liquid crystal layer disposed between the first substrate and the second substrate; wherein the first substrate includes a first display region and a bonding region disposed on a side of the first display region; the second substrate includes a second display region and a cutting region disposed on a side of the second display region; an orthographic projection of the cutting region on the first substrate overlaps an orthographic projection of the bonding region on the first substrate; the cutting region is provided with cutting lines; a side of the second substrate facing the first substrate is provided with a cut stop layer; and an orthographic projection of the cut stop layer on the second substrate includes an orthographic projection of the cutting line on the second substrate.

In an exemplary embodiment, a length of the cut stop layer in a first direction is equal to a length of the second substrate in the first direction.

In an exemplary embodiment, the cut stop layer includes a first side and a second side which are oppositely disposed along a second direction; a distance between an orthographic projection of the first side on the second substrate and the orthographic projection of the cutting line on the second substrate is greater than or equal to a preset first distance; a distance between an orthographic projection of the second side on the second substrate and the orthographic projection of the cutting line on the second substrate is greater than or equal to the preset first distance; and the first direction and the second direction intersect.

In an exemplary embodiment, the first distance is 30 microns to 2 millimeters.

In an exemplary embodiment, a width of the cut stop layer in the second direction is greater than 100 microns.

In an exemplary embodiment, a distance between the first side and the second display region is smaller than a distance between the second side and the second display region; the first substrate further includes a first sealant region disposed around the first display region and located on a side of the bonding region facing the first display region; the second substrate further includes a second sealant region disposed around the second display region and located on a side of the cutting region facing the second display region, wherein a sealant is disposed between the first sealant region and the second sealant region, and a shortest distance between the first side and the second sealant region is greater than 30 microns.

In an exemplary embodiment, a material of the cut stop layer is one or more metals among platinum (Pt), ruthenium (Ru), gold (Au), silver (Ag), molybdenum (Mo), chromium (Cr), aluminum (Al), tantalum (Ta), titanium (Ti), and tungsten (W).

In an exemplary embodiment, a thickness of the cut stop layer is 500 to 5000 angstroms.

In an exemplary embodiment, along a thickness direction of the display panel, the second display region includes a second flexible base substrate layer, a second insulating layer disposed on the second flexible base substrate layer, a black matrix disposed on the second insulating layer, and a color filter layer disposed on the second insulating layer and between adjacent black matrices; along the thickness direction of the display panel, the cutting region includes a second flexible base substrate layer, a second insulating layer disposed on the second flexible base substrate layer, and the cut stop layer disposed on the second insulating layer.

A display apparatus includes any of the above display panel.

Other features and advantages of the present disclosure will be described in the following description, and will be partially apparent from the description, or understood by implementing the present disclosure. Other advantages of the present disclosure may be implemented and achieved by the solutions described in the specification and accompanying drawings.

After the drawings and the detailed descriptions are read and understood, the other aspects may be comprehended.

BRIEF DESCRIPTION OF DRAWINGS

The drawings provide an understanding to the technical solutions of the present disclosure, form a part of the specification, and are adopted to explain, together with the embodiments of the present disclosure, the technical solutions of the present disclosure and not intended to form limits to the technical solutions of the present disclosure.

DETAILED DESCRIPTION

Figure 1:
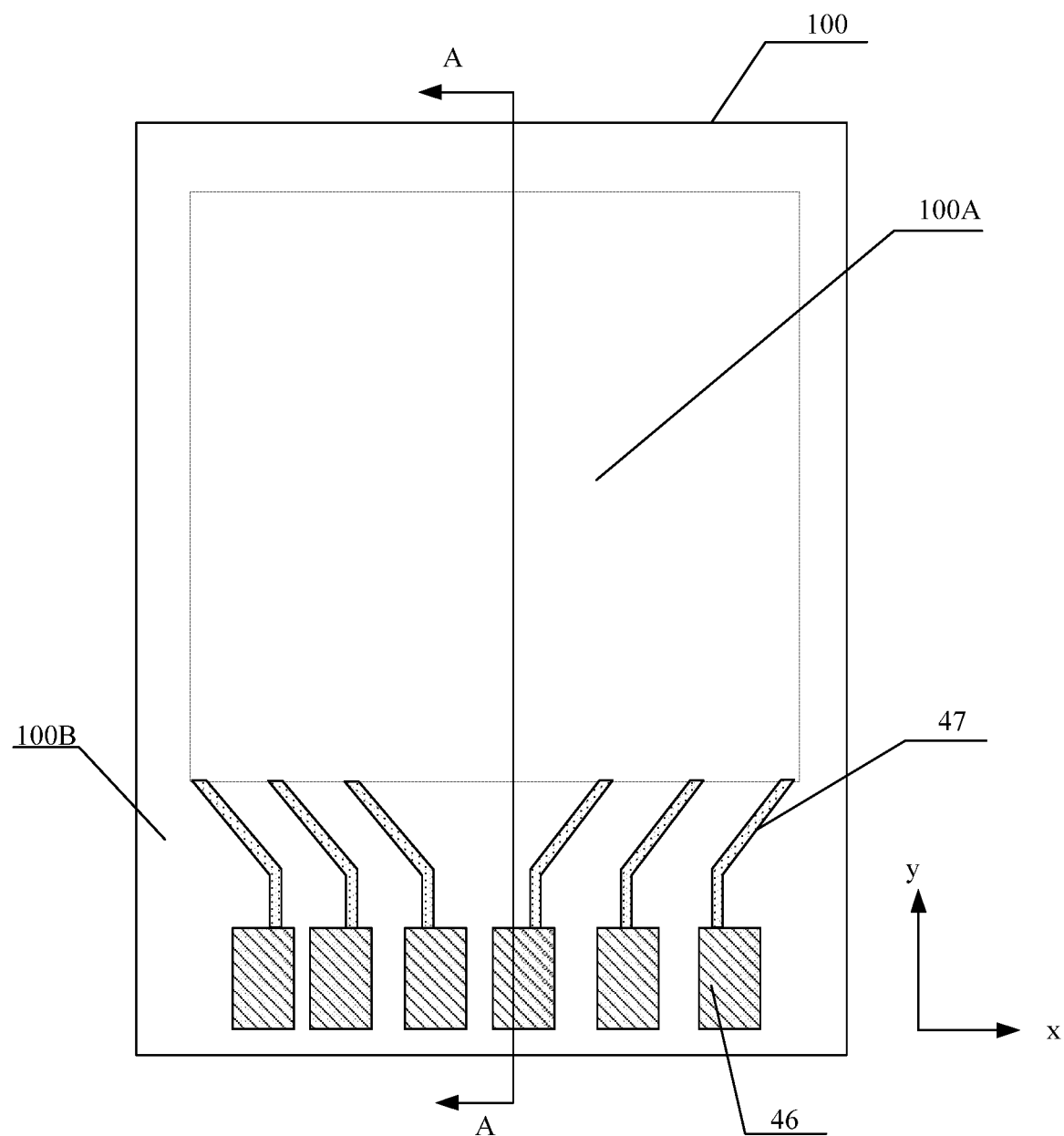
FIG. 1 is a schematic diagram of a structure of a first substrate according to an embodiment of the present disclosure.

Specific implementations of the present disclosure will be described further in detail below with reference to the accompanying drawings and embodiments. The following embodiments serve to illustrate the present disclosure, but are not intended to limit the scope of the present disclosure. Without conflict, the embodiments in the present disclosure and the features in the embodiments may be randomly combined with each other.

A display panel is mainly composed of a Thin Film Transistor (TFT) substrate, a second substrate, and a Liquid Crystal (LC) layer disposed between the two substrates. In a preparation process of the display panel, the second substrate needs to be cut to expose a bonding pad on the first substrate, and laser cutting is a commonly-used method. If the second substrate is cut before the first substrate and the second substrate are cell-assembled, due to a high energy density of a laser, large thermal stress will be generated at a cutting position, leading to a ridge at an edge of a cutting line, which in turn causes problems such as defective cell-assembly and uneven thickness of boxes between the first substrate and the second substrate. If the second substrate is cut after the first substrate and the second substrate are cell-assembled, a thermal stress generated at a laser cutting position will easily cause damage or failure to bonding pads and signal leads on the first substrate, thereby resulting in a problem of poor display or display failure of the display panel.

A Liquid crystal display (LCD) has advantages of high image quality, small size, light weight, low voltage drive, low power consumption, wide application range, and etc., and is widely used in consumer electronics or computer products such as a TV, a mobile phone, and a computer monitor. A liquid crystal display panel is mainly composed of a Thin Film Transistor (TFT) substrate, a second substrate, and a Liquid Crystal (LC) layer disposed between the two substrates. In a preparation process of the liquid crystal display panel, the second substrate needs to be cut to expose a bonding pad on the first substrate, and laser cutting is a commonly-used method.

With a gradual rise of wearable applications such as smart glasses and smart watches, a demand for flexible display devices in the display industry is increasing. However, when a substrate of a flexible liquid crystal display is changed from a traditional rigid glass to a flexible plastic substrate, many corresponding problems are generated, among which, how to effectively cut to expose a bonding pad without causing a damage to it is one of key technologies.

If the second substrate is cut before the first substrate and the second substrate are cell-assembled, due to a high energy density of a laser, a large thermal stress will be generated at a laser cutting position, leading to a ridge at an edge of a cutting line, which in turn causes problems such as defective cell-assembly and uneven thickness of boxes between the first substrate and the second substrate. If the second substrate is cut after the first substrate and the second substrate are cell-assembled, a thermal stress generated at a laser cutting position will easily cause damage or failure to bonding pads and signal leads on the first substrate, thereby resulting in a problem of poor display or display failure of the display panel.

An exemplary embodiment of the present disclosure provides a display panel including a first substrate, a second substrate, and a liquid crystal layer disposed between the first substrate and the second substrate, wherein the first substrate includes a first display region and a bonding region disposed on a side of the first display region; the second substrate includes a second display region and a cutting region disposed on a side of the second display region; an orthographic projection of the cutting region on the first substrate overlaps an orthographic projection of the bonding region on the first substrate; and the cutting region is provided with a cutting line.

A side of the second substrate facing the first substrate is further provided with a cut stop layer, and an orthographic projection of the cut stop layer on the second substrate includes an orthographic projection of the cutting line on the second substrate.

According to the display panel of the exemplary embodiment of the present disclosure, the cut stop layer is disposed on the side of the second substrate facing the first substrate, and the orthographic projection of the cut stop layer on the second substrate includes the orthographic projection of the cutting line on the second substrate, so that a laser energy will not cause damage or failure to bonding pad or signal leads on the first substrate, thereby improving display performance of the display panel.

In some exemplary embodiments, the cut stop layer may be disposed on a side of the first substrate facing the second substrate, which is not limited hereto in the present disclosure.

Figure 2:
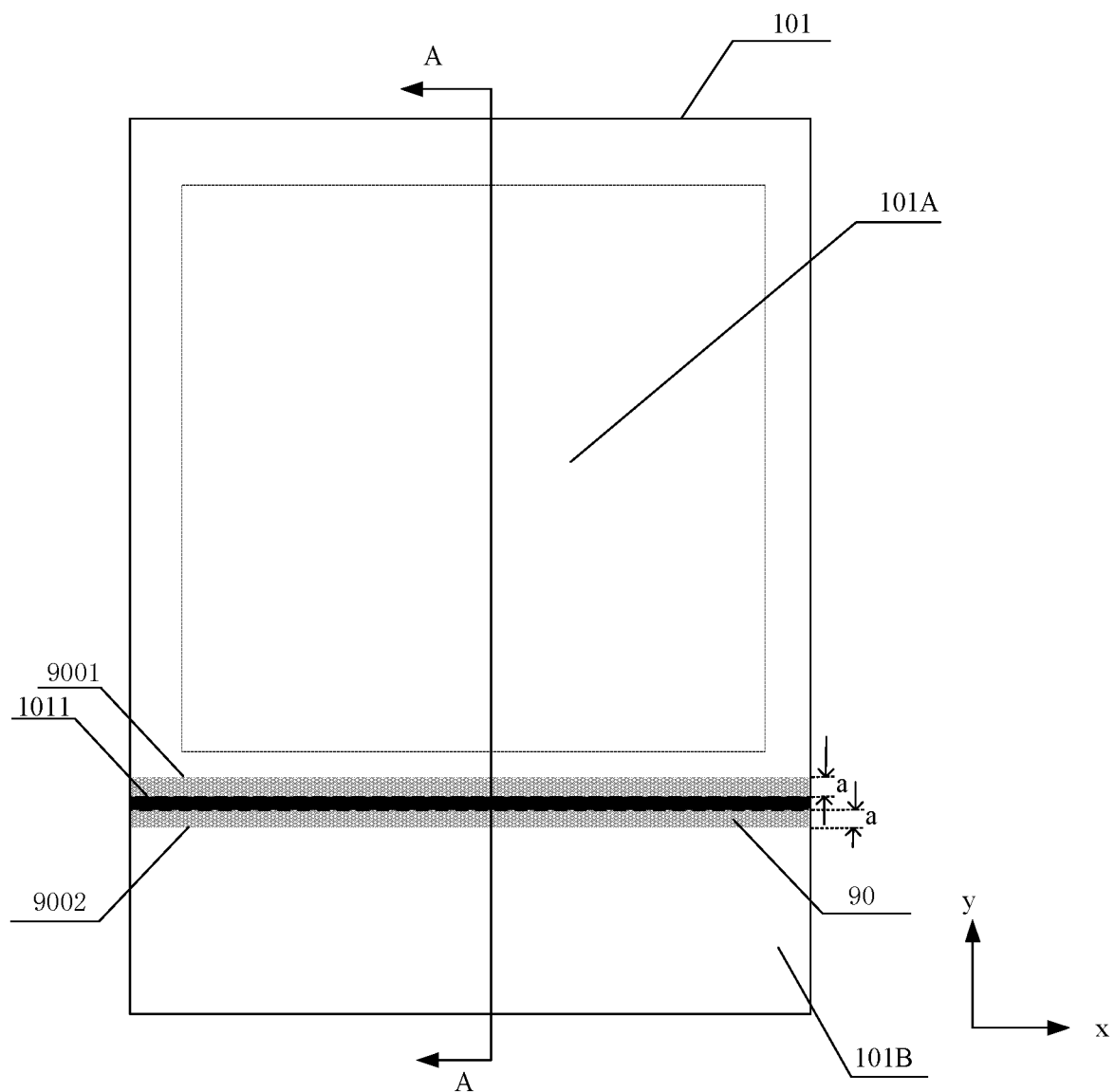
FIG. 2 is a schematic diagram of a structure of a second substrate according to an embodiment of the present disclosure.
Figure 3:
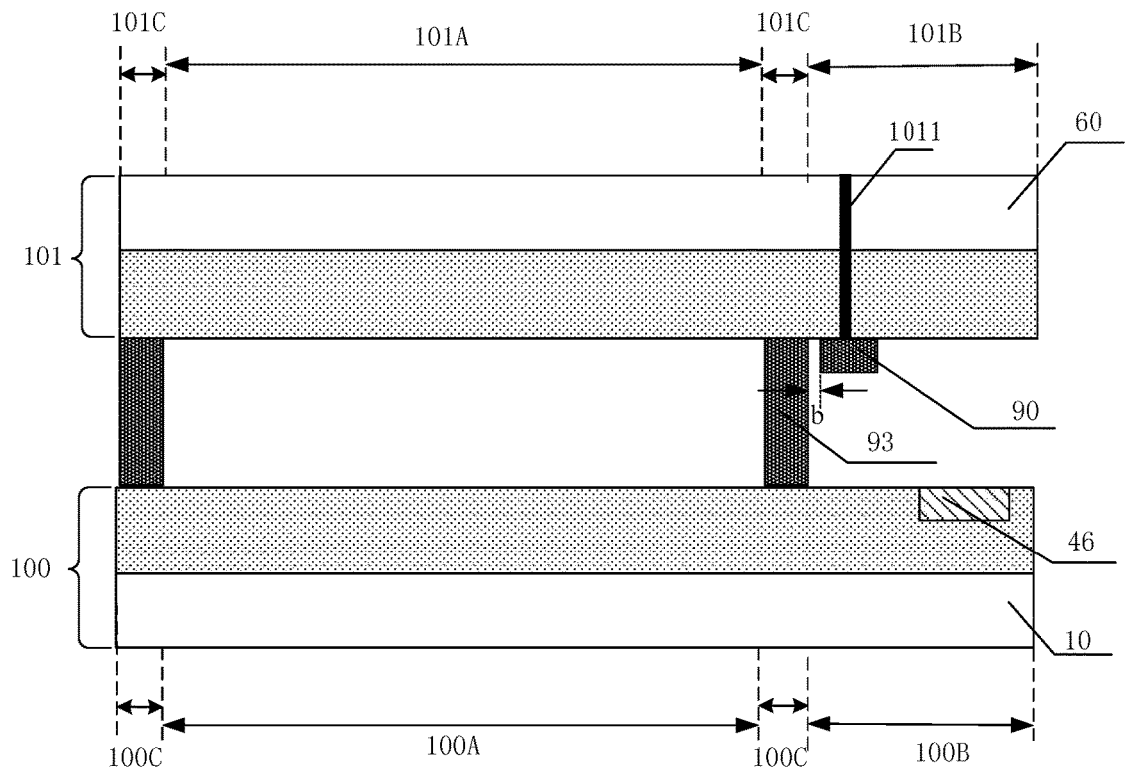
FIG. 3 is a schematic sectional view of a display panel in an AA direction after the first substrate shown in FIG. 1 and the second substrate shown in FIG. 2 being cell-assembled.

FIG. 1 is a schematic diagram of a structure of a first substrate 100 according to an embodiment of the present disclosure, FIG. 2 is a schematic diagram of a structure of a second substrate 101 according to an embodiment of the present disclosure, and FIG. 3 is a schematic sectional view in an AA direction after the first substrate 100 and the second substrate 101 respectively as shown in FIG. 1 and FIG. 2 being cell-assembled. As shown in FIG. 1 to FIG. 3, the first substrate 100 includes a first display region 100A, and a bonding region 100B disposed on a side of the first display region 100A. The bonding region 100B includes a plurality of bonding pads 46 and a plurality of signal leads 47; the second substrate 101 includes a second display region 101A and a cutting region 101B disposed on a side of the second display region 101A; positions of the first display region 100A and the second display region 101A correspond to each other; an orthographic projection of the cutting region 101B on the first substrate 100 and an orthographic projection of the bonding region 100B on the first substrate 100 overlap. The cutting region 101B is provided with a cutting line 1011.

A side of the second substrate 101 facing the first substrate 100 or a side of the first substrate 100 facing the second substrate 101 includes a cut stop layer 90, and an orthographic projection of the cut stop layer 90 on the second substrate 101 includes an orthographic projection of the cutting line 1011 on the second substrate 101.

In this exemplary embodiment, FIG. 3 only illustrates a relative positional relationship among the cutting region 101B, a bonding pad 46, and the cut stop layer 90, and does not represent an actual film layer structure of the first substrate 100 and the second substrate 101.

In an exemplary embodiment of the present disclosure, an orthographic projection of the cut stop layer 90 on the second substrate 101 includes an orthographic projection of the cutting line 1011 on the second substrate 101, which means that the orthographic projection of the cutting line 1011 on the second substrate 101 falls within a boundary line of the orthographic projection of the cut stop layer 90 on the second substrate 101.

In some exemplary embodiments, a length of the cut stop layer 90 in a first direction is equal to a length of the second substrate 101 in the first direction.

In some exemplary embodiments, the cut stop layer 90 includes a first side 9001 and a second side 9002 which are oppositely disposed along a second direction y. A distance a between an orthographic projection of the first side 9001 on the second substrate 101 and an orthographic projection of the cutting line 1011 on the second substrate 101 is greater than or equal to a preset first distance. A distance a between an orthographic projection of the second side 9002 on the second substrate 101 and an orthographic projection of the cutting line 1011 on the second substrate 101 is greater than or equal to a preset first distance, the first direction x and the second direction y intersect.

In some exemplary embodiments, the first distance may be 30 microns to 2 millimeters. Exemplarily, the first distance a may be 200 microns.

In some exemplary embodiments, the first direction x and the second direction y are perpendicular to each other.

In some exemplary embodiments, a distance between the first side 9001 and the second display region 101A is smaller than a distance between the second side 9002 and the second display region 101A.

The first substrate 100 further includes a first sealant region 100C, which is disposed around the first display region 100A and located on a side of the bonding region 100B facing the first display region 100A; the second substrate 101 further includes a second sealant region 101C, which is disposed around the second display region 101A and located on a side of the cutting region 101B facing the second display region 101A. A sealant 93 is disposed between the first sealant region 100C and the second sealant region 101C, and a shortest distance b between the first side 9001 and the second sealant region 101C is greater than a preset second distance.

In some exemplary embodiments, the second distance may be 25 microns to 35 microns. Exemplarily, the second distance may be 30 microns.

In some exemplary embodiments, the cut stop layer 90 may be made of one or more metals such as platinum (Pt), ruthenium (Ru), gold (Au), silver (Ag), molybdenum (Mo), chromium (Cr), aluminum (Al), tantalum (Ta), titanium (Ti), and tungsten (W).

In some exemplary embodiments, a thickness of the cut stop layer 90 may be 500 to 5000 angstroms. Exemplarily, a thickness of the cut stop layer 90 may be 1000 angstroms.

In some exemplary embodiments, a width of the cut stop layer 90 in the second direction y may be greater than 100 microns. Exemplarily, a width of the cut stop layer 90 in the second direction y may be 300 microns.

In some exemplary embodiments, along a thickness direction of the display panel, the second display region 101A includes a second flexible base substrate layer, a second insulating layer disposed on the second flexible base substrate layer, a black matrix disposed on the second insulating layer, and a color filter layer disposed on the second insulating layer and located between adjacent black matrices.

Along the thickness direction of the display panel, the cutting region 101B includes a second flexible base substrate layer, a second insulating layer disposed on the second flexible base substrate layer, and a cut stop layer disposed on the second insulating layer.

The technical solution of the exemplary embodiment is further illustrated below through a preparation process of a display panel of the exemplary embodiment. A "patterning process" mentioned in the exemplary embodiment includes procedures such as film layer deposition, photoresist coating, mask exposure, development, etching, and photoresist stripping, and is a mature preparation process in related art. Deposition may be performed by using a known process such as sputtering, evaporation, and chemical vapor deposition. Coating may be performed by using a known coating process, and etching may be performed by using a known approach, and a display apparatus is not limited here. In the description of the exemplary embodiment, a "thin film" refers to a layer of thin film manufactured through a certain material on a base substrate by using a deposition or coating process. If the "thin film" does not need a patterning process during a whole manufacturing process, the "thin film" may also be called a "layer". If the "thin film" needs a patterning process during the whole manufacturing process, it is called a "thin film" before the patterning process and is called a "layer" after the patterning process. The "layer" subsequent to the patterning process contains at least one "pattern".

The preparation process of the display panel in the exemplary embodiment mainly includes following acts.

(1) Preparing a first substrate 100 and a second substrate 101 on rigid substrates.

(2) Bonding the first substrate 100 and the second substrate 101 together through an cell-assembly process.

(3) Performing single-side cutting on the second substrate 101 to expose a plurality of bonding pads 46 in a bonding region.

(4) Lifting off the rigid substrates on the first substrate 100 and the second substrate 101.

(5) Attaching a polarizer.

(6) Bonding a chip and a flexible circuit board.

The preparation of the first substrate 100 in the act (1) includes following contents.

Figure 4:
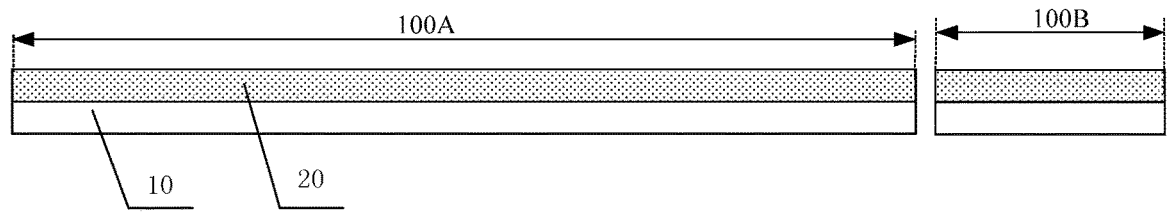
FIG. 4 is a schematic diagram of a structure of a first substrate after a first flexible base substrate layer is formed according to an embodiment of the present disclosure.

(1) As shown in FIG. 4, forming a first flexible base substrate layer 20 on a first rigid substrate 10.

In some exemplary embodiments, the first rigid substrate 10 may be a substrate made of a material with certain firmness such as glass, quartz, or transparent resin. The first flexible base substrate layer 20 may be a Polyimide (PI) layer.

In some exemplary embodiments, forming the first flexible base substrate layer 20 on the first rigid substrate 10 may include: coating a layer of PI solution on the first rigid substrate 10, and drying the PI solution to remove solvent of the PI solution, so that solutes of the PI solution are remained to form the first flexible base substrate layer 20. A drying process may be, for example, a low-pressure drying process, a high-pressure drying process, or an air-cooled drying process, which is not limited hereto in the embodiments of the present disclosure.

Figure 5:
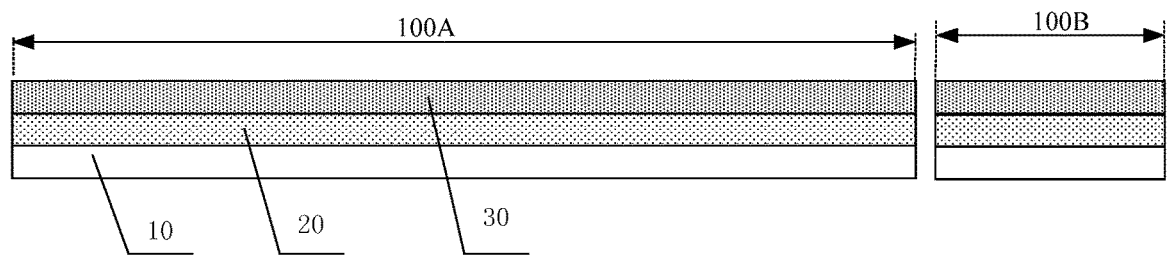
FIG. 5 is a schematic diagram of a structure of a first substrate after a first insulating layer is formed according to an embodiment of the present disclosure.

(2) As shown in FIG. 5, depositing a first insulating film on the first flexible base substrate layer 20 to form a first insulating layer 30 covering the entire first flexible base substrate layer 20. In an exemplary embodiment, the first insulating layer 30 is also called a first Buffer layer, which is used to improve water and oxygen resistance of a base substrate.

Figure 6:
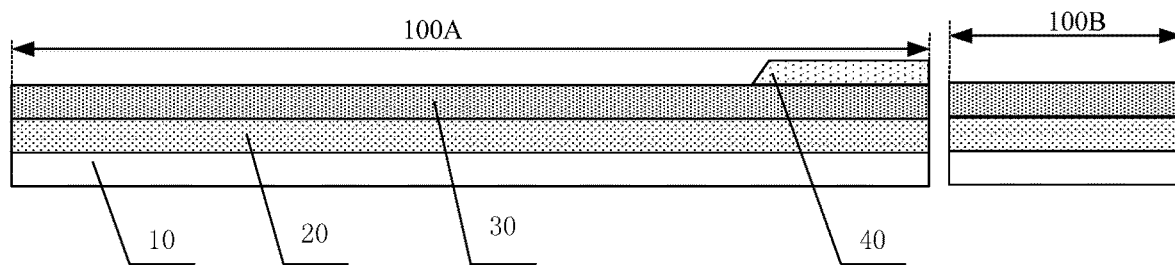
FIG. 6 is a schematic diagram of a structure of a first substrate after a common electrode is formed according to an embodiment of the present disclosure.

(3) As shown in FIG. 6, forming a pattern of a common electrode 40 in the first display region 100A. Forming the pattern of the common electrode 40 includes: depositing a first transparent conductive thin film on the first insulating layer 30 of the first display region 100A; coating a layer of photoresist on the first transparent conductive thin film; exposing and developing the photoresist by using a mask; forming an unexposed region at a position of the pattern of the common electrode; keeping the photoresist; forming a fully exposed region at other positions; removing the photoresist; etching the first transparent conductive thin film at the fully exposed region and stripping the remaining photoresist to form the pattern of the common electrode 40. In this exemplary embodiment, the common electrode may be a planar electrode. In this patterning process, there is no change in a film layer structure of the bonding region 100B, which includes the first rigid substrate 10, the first flexible base substrate layer 20 disposed on the first rigid substrate 10, and the first insulating layer 30 disposed on the first flexible base substrate layer 20.

Figure 7:
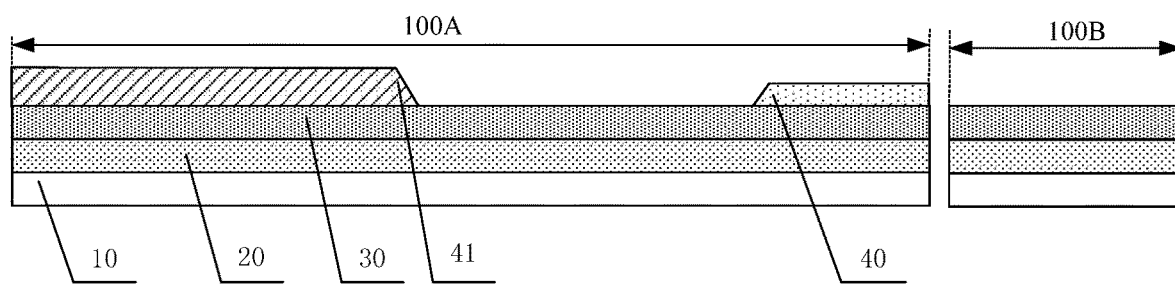
FIG. 7 is a schematic diagram of a structure of a first substrate after a gate line, a common electrode line, and a gate electrode are formed according to an embodiment of the present disclosure.

(4) As shown in FIG. 7, forming patterns of a gate line (not shown), a common electrode line (not shown), and a gate electrode 41 in the first display region 100A. Forming the patterns of the gate line, the common electrode line, and the gate electrode 41 include: depositing a first metal thin film on the first insulating layer 30 of the first display region 100A; coating a layer of photoresist on the first metal thin film; exposing and developing the photoresist by using a mask; forming an unexposed region at positions of the patterns of the gate line, the common electrode line, and the gate electrode 41; keeping the photoresist; forming a fully exposed region at other positions; removing the photoresist; etching the first metal thin film at the fully exposed region and stripping the remaining photoresist to form the patterns of the gate line, the common electrode line, and the gate electrode 41. In this exemplary embodiment, the gate line and the gate electrode 41 may have an integrated structure, and the gate electrode 41 is in charge of providing turn-on and turn-off voltages of a thin film transistor. The common electrode line is parallel to the gate line and directly connected to the common electrode 40 (the common electrode line is directly deposited on an upper edge of the common electrode), and is in charge of introducing a common voltage. In this patterning process, there is no change in a film layer structure of the bonding region 100B.

Figure 8:
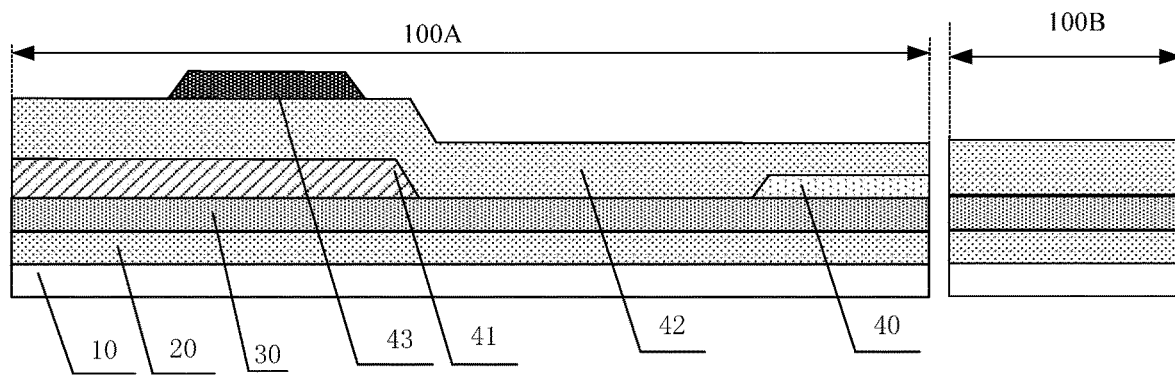
FIG. 8 is a schematic diagram of a structure of a first substrate after an active layer is formed according to an embodiment of the present disclosure.

(5) As shown in FIG. 8, forming a pattern of an active layer 43 in the first display region 100A. Forming the pattern of the active layer in the first display region 100A includes: depositing a gate insulating layer 42 covering an entire base substrate, then depositing an active layer thin film, patterning the active layer thin film, and forming the pattern of the active layer 43 in the first display region 100A, wherein the active layer 43 is above the gate electrode 41. In this patterning process, only one gate insulating layer 42 is added on the first insulating layer 30 in the film layer structure of the bonding region 100B.

Figure 9:
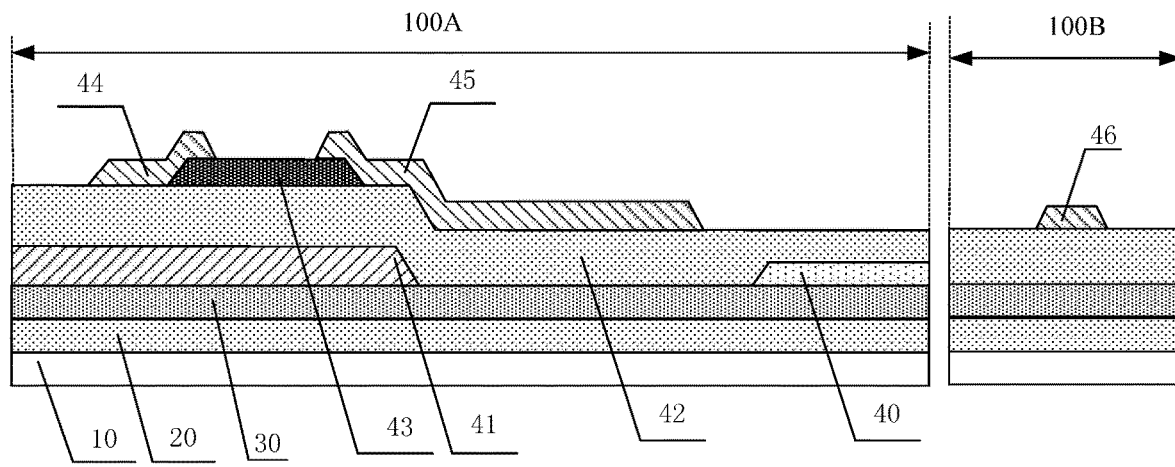
FIG. 9 is a schematic diagram of a structure of a first substrate after a data line, a source electrode, and a drain electrode are formed according to an embodiment of the present disclosure.

(6) As shown in FIG. 9, forming patterns of a data line (not shown), a source electrode 44, and a drain electrode 45 in the first display region 100A, and forming patterns of bonding pads 46 and signal leads 47 (not shown in FIG. 9) in the bonding region 100B. The process includes: depositing a second metal thin film, patterning the second metal thin film to form the patterns of the data line, the source electrode 44, and the drain electrode 45, and the patterns of the bonding pads 46 and the signal leads 47, wherein the source electrode 44 is connected to the data line, and the drain electrode 45 and the source electrode 44 are oppositely disposed to form a horizontal channel. The gate electrode 41, the active layer 43, the source electrode 44, and the drain electrode 45 constitute a thin film transistor, and the data line perpendicularly intersects with the gate line and is in charge of providing a signal voltage.

Figure 10:
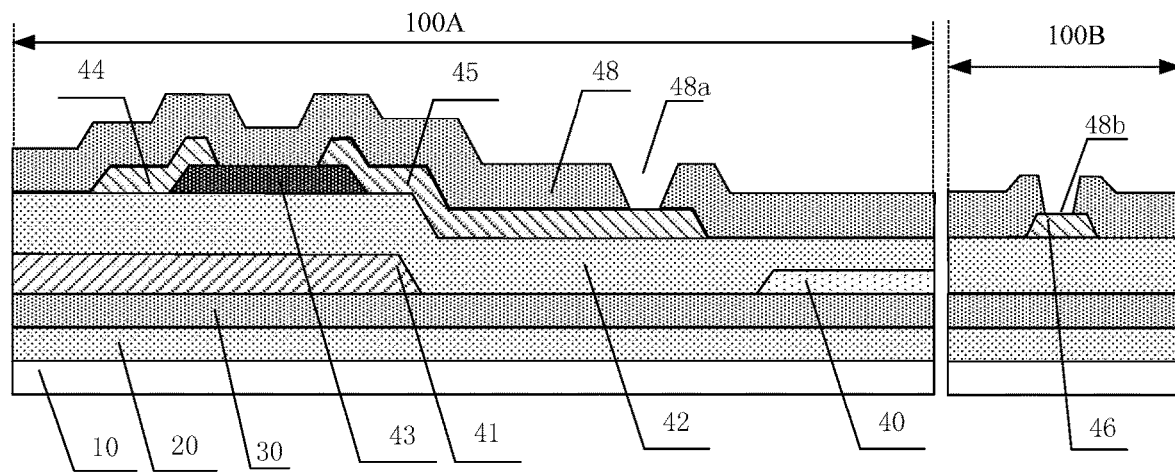
FIG. 10 is a schematic diagram of a structure of a first substrate after a passivation layer is formed according to an embodiment of the present disclosure.

(7) As shown in FIG. 10, forming a pattern of a passivation layer 48 with via holes in the first display region 100A and the bonding region 100B. Forming the pattern of the passivation layer 48 with via holes includes: depositing a passivation layer thin film, coating a layer of photoresist on the passivation layer thin film, exposing and developing the photoresist by a mask, forming a fully exposed region at a position of a first via hole, removing the photoresist, forming unexposed regions at other positions, keeping the photoresist, etching the passivation layer thin film in the fully exposed region and stripping the remaining photoresist to form the pattern of the passivation layer 48 with the first via hole 48a and a second via hole 48b, wherein the first via hole 48a is located at a position of the drain electrode 45, and the passivation layer thin film in the first via hole 48a is etched away to expose a surface of the drain electrode 45; the second via hole 48b is located at a position of the bonding pad 46, and the passivation thin film in the second via hole 48b is etched away to expose a surface of the bonding pad 46.

Figure 11:
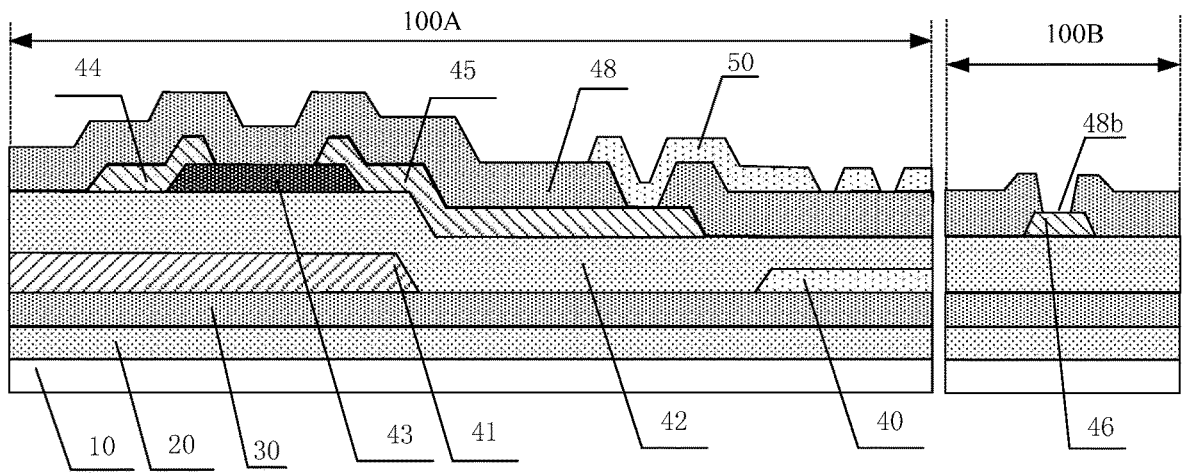
FIG. 11 is a schematic diagram of a structure of a first substrate after a pixel electrode is formed according to an embodiment of the present disclosure.

(8) As shown in FIG. 11, forming a pattern of a pixel electrode 50 in the first display region 100A. Forming the pattern of the pixel electrode 50 includes: depositing a second transparent conductive thin film, patterning the second transparent conductive thin film to form the pattern of the pixel electrode 50, wherein the pixel electrode 50 is located in a pixel region defined by a gate line and a data line, and is connected to the drain electrode 45 through the first via 48a. In this exemplary embodiment, the pixel electrode 50 is a slit electrode with a certain inclination angle. In this patterning process, there is no change in a film layer structure of the bonding region 100B.

In this exemplary embodiment, the first metal thin film and the second metal thin film may be made of one or more metals, such as platinum (Pt), ruthenium (Ru), gold (Au), silver (Ag), molybdenum (Mo), chromium (Cr), aluminum (Al), tantalum (Ta), titanium (Ti), and tungsten (W). The first insulating thin film, the gate insulating layer, and the passivation layer may be made of silicon nitride (SiNx), silicon oxide (SiOx), or a SiNx/SiOx composite thin film. The first transparent conductive thin film and the second transparent conductive thin film may be made of indium tin oxide (ITO) or indium zinc oxide (IZO). The material of the active layer may be silicon semiconductor or metal oxide semiconductor.

Although this exemplary embodiment describes a process of preparing the first substrate 100 by taking six patterning processes as an example, in practice, the first substrate 100 of this exemplary embodiment may be prepared through five patterning processes or fewer patterning processes. For example, the above-mentioned patterning process for forming the pattern of the common electrode and the patterning process for forming the patterns of the gate line, the common electrode line, and the gate electrode may be formed by an one-time patterning process using a halftone mask or gray tone mask technology, and the patterning process for forming the pattern of the active layer and the patterning process for forming the patterns of the data line, the source electrode, and the drain electrode may also be formed by an one-time patterning process using a halftone mask or gray tone mask technology. Although this exemplary embodiment describes a structure of a thin film transistor by taking a bottom gate structure as an example, the thin film transistor may also adopt a top gate structure in an actual implementation, which is not limited hereto in the present disclosure.

While an ADS type first substrate is taken as an example in this exemplary embodiment, a technical concept of the present disclosure may also be applied to Twisted Nematic (TN) type, In Plane switching (IPS) type, and Fringe Field Switching (FFS) type first substrates.

Through the above processes, the preparation of the first substrate 100 according to the exemplary embodiment of the present disclosure is completed.

The preparation of the second substrate 101 in the act (1) may include following contents.

Figure 12:
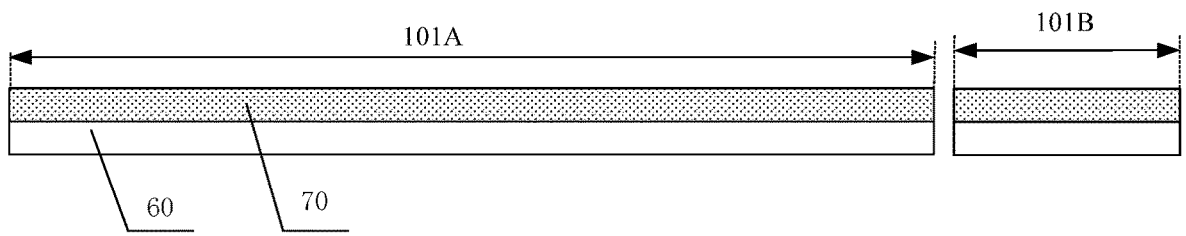
FIG. 12 is a schematic diagram of a structure of a second substrate after a second flexible base substrate layer is formed according to an embodiment of the present disclosure.

(1) As shown in FIG. 12, forming a second flexible base substrate layer 70 on a second rigid substrate 60.

In some exemplary embodiments, the second rigid substrate 60 may be a substrate made of a material with certain firmness such as glass, quartz, or transparent resin. The second flexible base substrate layer 70 may be a Polyimide (PI) layer.

In some exemplary embodiments, forming the second flexible base substrate layer 70 on the second rigid substrate 60 may include: coating a layer of PI solution on the second rigid substrate 60, and drying the PI solution to remove solvent of the PI solution, so that solutes of the PI solution remain to form the second flexible base substrate layer 70. A drying process may be, for example, a low-pressure drying process, a high-pressure drying process, or an air-cooled drying process, which is not limited hereto in the embodiments of the present disclosure.

Figure 13:
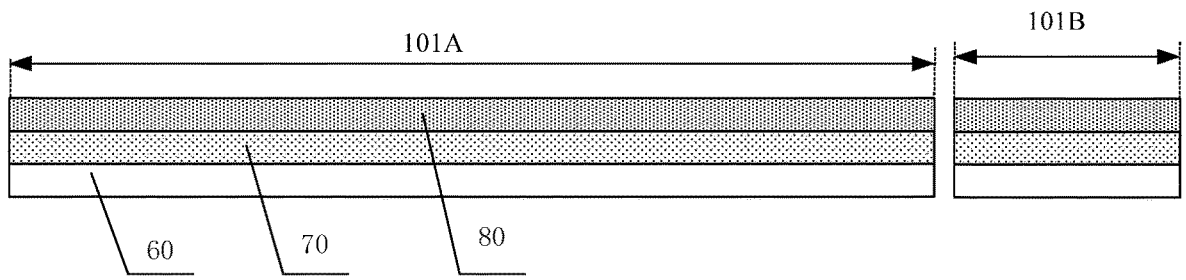
FIG. 13 is a schematic diagram of a structure of a second substrate after a second insulating layer is formed according to an embodiment of the present disclosure.

(2) As shown in FIG. 13, depositing a second insulating thin film on the second flexible base substrate layer 70 to form a second insulating layer 80 covering the entire second flexible base substrate layer 70. In an exemplary embodiment, the second insulating layer 80 is also called a second Buffer layer, which is used to improve water and oxygen resistance of a base substrate. The first insulating film may be made of silicon nitride (SiNx), silicon oxide (SiOx), or a SiNx/SiOx composite thin film.

Figure 14:
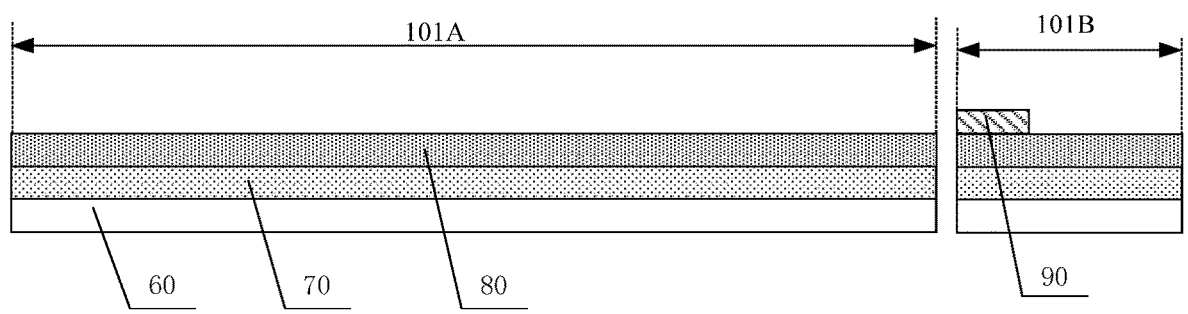
FIG. 14 is a schematic diagram of a structure of a second substrate after a cut stop layer is formed according to an embodiment of the present disclosure.
Figure 15:
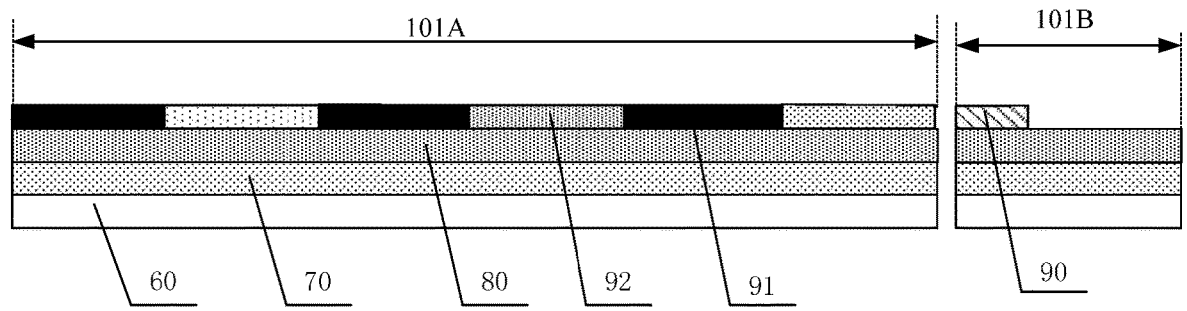
FIG. 15 is a schematic diagram of a structure of a second substrate after a black matrix and a color filter layer are formed according to an embodiment of the present disclosure.

(3) As shown in FIG. 14, forming a cut stop layer 90 on the second insulating layer 80. Forming the cut stop layer 90 includes: depositing a third metal thin film and patterning the third metal thin film to form a pattern of the cut stop layer 90. In this exemplary embodiment, an orthographic projection of the cut stop layer 90 on the second substrate 101 covers an orthographic projection of the cutting line 1011 on the second substrate 101. The cutting line 1011 in the exemplary embodiment of the present disclosure may be a virtual straight line, which may be identified by an alignment mark and used for alignment during laser cutting.

In an exemplary embodiment, a width of the cut stop layer 90 in the second direction y is greater than 100 microns, and preferably, a width of the cut stop layer 90 in the second direction y may be 300 microns.

In an exemplary embodiment, a thickness of the cut stop layer 90 may be 500 to 5000 angstroms, and preferably, a thickness of the cut stop layer 90 may be 1000 angstroms.

In an exemplary embodiment, the cut stop layer 90 may be made of one or more metals, such as platinum (Pt), ruthenium (Ru), gold (Au), silver (Ag), molybdenum (Mo), chromium (Cr), aluminum (Al), tantalum (Ta), titanium (Ti), and tungsten (W).

(4) As shown in FIG. 14, forming black matrices 91 in the second display region 101A, and forming color filter layers 92 between the black matrices 91.

In this exemplary embodiment, an order of forming patterns of the black matrices and the color filter layers and forming the cut stop layer 90 may be reversed, that is, the pattern of the cut stop layer 90 may be formed first, and then the patterns of the black matrices and color filter layers are formed.

Through the above processes, the preparation of the second substrate 101 according to the exemplary embodiment of the present disclosure is completed.

The act (2) may include: coating a sealant 93 on a periphery of the first substrate 100, dropping liquid crystal on the second substrate 101, and cell-assembling the second substrate 101 filled with liquid crystal with the first substrate 100 coated with the sealant 93; and solidifying the sealant 93 by ultraviolet rays to complete an cell-assembly process.

The act (3) may include: performing single-side cutting on the second substrate 101 by using a laser incident from a side of the second rigid substrate 60 along a cutting region. A residual energy of the laser penetrating after cutting the second substrate 101 will be absorbed or reflected by the cut stop layer, and will not cause damage to the first substrate. After the cutting is completed, the cutting region 101B is cut off, and there will be residual metal of the cut stop layer in the cutting region. However, due to protection of an insulating layer on the bonding region, the residual metal of the cut stop layer will not cause a risk of a short circuit.

In an exemplary embodiment, a transmittance of a laser wavelength used for laser cutting to a rigid carrier (in this exemplary embodiment, the rigid carrier refers to the second rigid substrate 60) is greater than 80%, and preferably, a transmittance to the rigid carrier is greater than 90%.

In an exemplary embodiment, a transmittance of a laser wavelength used for laser cutting to a flexible substrate (in this exemplary embodiment, the flexible substrate refers to the second flexible base substrate layer 70) is less than 5%; preferably, a transmittance to the flexible substrate is less than 1%.

In an exemplary embodiment, a transmittance of a laser wavelength used for laser cutting to the cut stop layer 90 is less than 1%; preferably, a transmittance to the cut stop layer 90 is less than 0.01%.

The act (4) may include: lifting off the second rigid substrate 60 and the second flexible base substrate layer 70 and lifting off the first rigid substrate 10 and the second flexible base substrate layer 20 by using a lift-off process or a laser.

The act (5) may include: attaching a first polarizer on a side of the first substrate 100 away from the second substrate 101 and attaching a second polarizer on a side of the second substrate 101 away from the first substrate 100.

The act (6) may include: bonding a chip and a flexible circuit board for the first substrate 100.

Through the above processes, the preparation of the display panel according to an exemplary embodiment of the present disclosure is completed. From the above preparation processes, it may be seen that according to the display panel of the exemplary embodiment of the present disclosure, the cut stop layer 90 is disposed on a side of the second substrate 101 facing the first substrate 100, and an orthographic projection of the cut stop layer 90 on the second substrate 101 includes an orthographic projection of the cutting line 1011 on the second substrate 101, so that a laser energy will not cause damage or failure to the bonding pads 46 or signal leads 47 on the first substrate 100, thereby improving display performance of the display panel.

An exemplary embodiment of the present disclosure further provides a display apparatus, including the aforementioned display panel. The display apparatus may be: any product or component with a display function, such as a mobile phone, a tablet computer, a television, a display, a laptop computer, a digital photo frame, or a navigator.

In the description of the embodiments of the present disclosure, an orientation or positional relation indicated by terms "middle", "up", "down", "front", "back", "vertical", "horizontal", "top", "bottom", "inside", "outside", and etc. is based on an orientation or positional relation shown in the drawings, and is merely for convenience of describing the present disclosure and simplifying the description, rather than indicating or implying that the apparatus or elements referred to must have a particular orientation, or configured or operated in a particular orientation. Thus, it may not be construed as limitations on the present disclosure.

In the description of the embodiments of the present disclosure, it should be noted that, unless otherwise specified and defined clearly, terms "install", "connect", and "couple" should be understood in a broad sense, for example, may be a fixed connection, a detachable connection, or an integral connection; may be a mechanical connection or an electrical connection; may be a direct connection, an indirect connection through an intermediary, or an internal connection between two elements. For those skilled in the art, the meanings of the above terms in a display apparatus in the present disclosure may be understood according to a situation.

Although the embodiments disclosed in the present disclosure are as described above, the content described is merely embodiments for facilitating understanding of the present disclosure and is not used to limit the present disclosure. Any person skilled in the art to which the present disclosure pertains may make modifications and variations in implementation forms and details without departing from the essence and scope of the present disclosure, but the scope of patent protection of the present disclosure should still be subject to the scope defined by the appended claims.

What is claimed is:

1. A display panel, comprising:
   a first substrate and a second substrate disposed oppositely, and a liquid crystal layer disposed between the first substrate and the second substrate, wherein:
   the first substrate comprises a first display region and a bonding region disposed on a side of the first display region;
   the second substrate comprises a second display region and a cutting region disposed on a side of the second display region, wherein an orthographic projection of the cutting region on the first substrate is overlapped with an orthographic projection of the bonding region on the first substrate; the cutting region is provided with a cutting line;
   a side of the second substrate facing the first substrate is provided with a cut stop layer, and an orthographic projection of the cut stop layer on the second substrate comprises an orthographic projection of the cutting line on the second substrate;
   a length of the cut stop layer in a first direction is equal to a length of the second substrate in the first direction;
   the cut stop layer comprises a first side and a second side which are oppositely disposed along a second direction, a distance between an orthographic projection of the first side on the second substrate and the orthographic projection of the cutting line on the second substrate is greater than or equal to a preset first distance, and a distance between an orthographic projection of the second side on the second substrate and the orthographic projection of the cutting line on the second substrate is greater than or equal to the preset first distance; the first direction and the second direction intersect;
   the first distance is 30 microns to 2 millimeters; and
   the second display region comprises a second rigid substrate and a second flexible base substrate layer stacked on the second rigid substrate, wherein a transmittance of a laser wavelength used for laser cutting to the second rigid substrate is greater than 80%, a transmittance of a laser wavelength used for laser cutting to the second flexible base substrate layer is less than 5%, and a transmittance of a laser wavelength used for laser cutting to the cut stop layer is less than 1%.

2. The display panel of claim 1, wherein a width of the cut stop layer in the second direction is greater than 100 microns.

3. The display panel of claim 1, wherein a distance between the first side and the second display region is smaller than a distance between the second side and the second display region;
   the first substrate further comprises a first sealant region disposed around the first display region and located on a side of the bonding region facing the first display region; the second substrate further comprises a second sealant region disposed around the second display region and located on a side of the cutting region facing the second display region, wherein a sealant is disposed between the first sealant region and the second sealant region, and a shortest distance between the first side and the second sealant region is greater than 30 microns.

4. The display panel of claim 1, wherein a material of the cut stop layer is one or more metals among platinum (Pt), ruthenium (Ru), gold (Au), silver (Ag), molybdenum (Mo), chromium (Cr), aluminum (Al), tantalum (Ta), titanium (Ti), and tungsten (W).

5. The display panel of claim 1, wherein a thickness of the cut stop layer is 500 to 5000 angstroms.

6. The display panel of claim 1, wherein along a thickness direction of the display panel, the second display region comprises a second flexible base substrate layer, a second insulating layer disposed on the second flexible base substrate layer, a black matrix disposed on the second insulating layer, and a color filter layer disposed on the second insulating layer and located between adjacent black matrices;

along the thickness direction of the display panel, the cutting region comprises the second flexible base substrate layer, the second insulating layer disposed on the second flexible base substrate layer, and the cut stop layer disposed on the second insulating layer.

7. A display apparatus, comprising a display panel, the display panel comprises a first substrate and a second substrate oppositely disposed, and a liquid crystal layer disposed between the first substrate and the second substrate, wherein:

the first substrate comprises a first display region and a bonding region disposed on a side of the first display region;

the second substrate comprises a second display region and a cutting region disposed on a side of the second display region, wherein an orthographic projection of the cutting region on the first substrate is overlapped with an orthographic projection of the bonding region on the first substrate; the cutting region is provided with a cutting line;

a side of the second substrate facing the first substrate is provided with a cut stop layer, and an orthographic projection of the cut stop layer on the second substrate comprises an orthographic projection of the cutting line on the second substrate;

a length of the cut stop layer in a first direction is equal to a length of the second substrate in the first direction;

the cut stop layer comprises a first side and a second side which are oppositely disposed along a second direction; a distance between an orthographic projection of the first side on the second substrate and the orthographic projection of the cutting line on the second substrate is greater than or equal to a preset first distance; a distance between an orthographic projection of the second side on the second substrate and the orthographic projection of the cutting line on the second substrate is greater than or equal to the preset first distance; and the first direction and the second direction intersect;

the first distance is 30 microns to 2 millimeters; and the second display region comprises a second rigid substrate and a second flexible base substrate layer stacked on the second rigid substrate, wherein a transmittance of a laser wavelength used for laser cutting to the second rigid substrate is greater than 80%, a transmittance of a laser wavelength used for laser cutting to the second flexible base substrate layer is less than 5%, and a transmittance of a laser wavelength used for laser cutting to the cut stop layer is less than 1%.

8. The display apparatus of claim 7, wherein a width of the cut stop layer in the second direction is greater than 100 microns.

9. The display apparatus of claim 7, wherein a distance between the first side and the second display region is smaller than a distance between the second side and the second display region;

the first substrate further comprises a first sealant region disposed around the first display region and located on a side of the bonding region facing the first display region; the second substrate further comprises a second sealant region disposed around the second display region and located on a side of the cutting region facing the second display region, wherein a sealant is disposed between the first sealant region and the second sealant region, and a shortest distance between the first side and the second sealant region is greater than 30 microns.

10. The display apparatus of claim 7, wherein a material of the cut stop layer is one or more metals among platinum (Pt), ruthenium (Ru), gold (Au), silver (Ag), molybdenum (Mo), chromium (Cr), aluminum (Al), tantalum (Ta), titanium (Ti), and tungsten (W).

11. The display apparatus of claim 7, wherein a thickness of the cut stop layer is 500 to 5000 angstroms.

12. The display apparatus of claim 7, wherein along a thickness direction of the display panel, the second display region comprises a second flexible base substrate layer, a second insulating layer disposed on the second flexible base substrate layer, a black matrix disposed on the second insulating layer, and a color filter layer disposed on the second insulating layer and located between adjacent black matrices;

along the thickness direction of the display panel, the cutting region comprises the second flexible base substrate layer, the second insulating layer disposed on the second flexible base substrate layer, and the cut stop layer disposed on the second insulating layer.

* * * * *